United States Patent Office 3,792,039
Patented Feb. 12, 1974

3,792,039
POLY 2'-FLUORO-2'-DEOXYURIDYLIC ACID
Robert Joseph Erickson, Michael Paul Kotick, Lawrence Francis Reverman, and Dan P. Wilson, Elkhart, Ind., assignors to Miles Laboratories, Inc., Elkhart, Ind.
No Drawing. Filed Dec. 27, 1971, Ser. No. 212,619
Int. Cl. C07d 51/52
U.S. Cl. 260—211.5 R            2 Claims

ABSTRACT OF THE DISCLOSURE

The synthesis and enzyme inhibition properties of poly 2'-fluoro-2'-deoxyuridylic acid (poly dUfl) is disclosed.

---

Recently it has been found by various investigators that certain enzymes may be involved in tumor formation. Thus, in The Sciences, June–July 1971, pages 12 et seq., the findings of such investigations are reported, including the fact that reverse transcriptase activity was found in tumor viruses in mammals.

It has now unexpectedly been found that a new polynucleotide, i.e. poly 2'-fluoro-2'-deoxyuridylic acid (hereinafter called poly dUfl) is useful in inhibiting reverse transcriptase activity. The following examples disclose preferred embodiments for preparing the novel monomer, 2'-fluoro-2' - deoxyuridine-5' - diphosphate (hereinafter called dUflDP) from which poly dUfl is prepared and data showing the inhibition of reverse transcriptase by poly dUfl.

EXAMPLE 1

2'-fluoro-2'-deoxyuridine-5'-monophosphate was prepared by adding 500 mg., 2 mmole, of 2'-fluoro-2'-deoxyuridine to a stirred solution of 0.9 ml., 10 mmole of POCl$_3$ in 4 ml. of trimethyl phosphate cooled to 4° C. Reaction was complete in 5 hours as indicated by thin layer chromatography (TLC). This mixture was added to 40 ml. of ice water and stirred for 30 minutes. After adjusting the pH to 8 with 4 M sodium hydroxide, the solution was evaporated to dryness at 35° C. The residue was dissolved in a minimum amount of water and applied to a 100 ml. Dowex 1-X8 (formate) column. After elution with water to remove UV absorbing material, the column was eluated with a linear gradient of 2–6 M formic acid. One major peak eluted was shown to be homogeneous by TLC. The appropriate fractions were pooled and the eluate evaporated to dryness several times until no trace of formic acid could be detected. The amount of 2'-fluoro-2'-deoxyuridine-5'-monophosphate was determined spectrophotometrically to be 1.6 mmole (80%).

This material (1.6 mmole) was dissolved in 35 ml. of a 50% aqueous tert-butyl alcohol solution to which had been added 0.55 ml., 6.4 mmole of morpholine. The reaction mixture was gently refluxed with stirring while a solution of 6.4 mmole N,N'-dicyclohexylcarbodiimide in tert-butyl alcohol was added dropwise over a period of 1.5 hours. Reaction was complete after an additional 2 hour reflux as indicated by TLC (Isosopropanol/NH$_3$H$_2$0; 6/3/1.) Heat was removed and the reaction was allowed to cool to room temperature with stirring. The precipitated dicyclohexylurea was filtered, washed with alcohol, and the filtrate evaporated to dryness in vacuo. The residue was dissolved in 50 ml. of water and extracted with 3× 50 ml. portions of ethyl ether. The aqueous layer was concentrated to dryness. The flask was then placed in a vacuum desiccator and dried over P$_2$O$_5$. The yield of 2' - fluoro-2'-deoxyuridine-5'-phosphoromorpholidate was almost quantitative (about 1.1 g.).

The 5'-phosphoromorpholidate (about 1.6 mmole) was dissolved in 10 ml. anhydrous pyridine and added to a flask containing mono-tri-n-butylammonium orthophosphate (prepared from 5 mmoles 85% phosphoric acid and 5 mmoles tri-n-butylamine and rendered anhydrous by three evaporations with anhydrous pyridine). The mixture was stirred under anhydrous conditions for 48 hours. The solvent was removed in vacuo (35° C.) and the residue co-evaporated with water (3× 20 ml.). The glassy residue was then dissolved in 20 ml. of water, the pH adjusted to 7 with 1 M aqueous ammonia, and applied to a 100 ml. Dowex 1-X8 (acetate) column. Elution with a linear gradient of 0.0–1.5 M ammonium acetate (total volume = 8 liter) gave two major peaks.

| Fractions (25 ml. each) | Conc. (mmoles) | R$_f$ | Wt. of lyoph. material (mg.) |
|---|---|---|---|
| A (89–107) | 0.22 | 0.57 | 200 |
| B (153–178) | 0.71 | 0.44 | 399 |

Fraction B was lyophilized several times to remove the acetate salt and contained the dUflDP.

EXAMPLE 2

Preparation of Poly dUfl

Polymerization of the dUflDP was undertaken with poly-nucleotide phosphorylase which was prepared from *Escherichia coli*. The reaction vessel contained 50 mM. Tris buffer pH 8.2, 5 mM. MgCl$_2$, 20 mmoles dUflDP and the enzyme. The extent of polymerization was followed by assaying for inorganic phosphate. After incubation at 37° C., the reaction mixture was extracted with an equal volume of phenol saturated with Tris buffer. The aqueous layer was then applied to a chromatographic column, 2.5 × 95 cm., containing Sephadex G–50, and the column was developed with 0.1 M ammonium acetate pH 7.0. The fraction containing polymeric material was lyophilized. Poly dUfl thus obtained had the following characteristics: S$_{20}$=12.3 in 0.1 M NaCl and 0.02 M Tris buffer pH 7; E$_{260}$ of 8.6×10$^3$ in H$_2$O was based on the phosphorus analysis.

EXAMPLE 3

Inhibition of reverse transcriptase using poly dUfl

In this example poly dUfl was shown to be a potent inhibitor of the reverse transcriptase enzyme of the avian myeloblastosis virus (AMV). Enzyme activity was assayed using detergent-disrupted virus, isotopically labelled deoxynucleoside triphosphate and synthetic polyribonucleotines as templates. Specifiially, AMV in TNE buffer [0.01 M Tris-HCl (pH 8.3), 0.15 M NaCl, 1 mM. EDTA] was made 1% with respect to NP40 [Nonidet P–40 (Shell Chemical Co.)] detergent and held at 4° C. for 10 minutes. 27µg. of the AMV protein obtained was then added to a 125 µl. reaction mixture containing 22 mM. MgCl$_2$, 40 mM. KCl, 3 mM. dCTP (deoxycytidine triphosphate), 0.8 mM. dGTP (deoxyguanosine triphosphate), 0.005 µC. $^3$H-dGTP (final specific activity of 18 c.p.m./picomole dGTP) and 0.42 µg. of oligo dC·poly rC. All solutions were prepared in 0.01 M Tris (pH 8.3) and 1 mM. dithiothreitol. The reaction was terminated after 20 minutes at 37° C. and the amount of $^3$H-dGTP converted to acid insoluble material was determined. In the absence of poly dUfl it was found that 17,912 counts/minute became acid insoluble while only 710 counts/minute were observe in the presence of 0.10 µg. of poly dUfl. The inhibition caused by poly dUfl was insensitive to the presnce of RNase at a concentration of 10 µg./ml.

Using similar assay systems employing DNA-dependent DNA polymerases isolated from *Micrococcus luteus* and calf thymus, it was found that poly dUfl did not inhibit these enzymes at 100 times the concentration required for a 90% reduction in the activity of the AMV reverse transcriptase. Hence, poly dUfl was found to be specific for the RNA-dependent DNA polymerase.

What is claimed is:
1. 2'-fluoro-2'-deoxyuridine-5'-diphosphate.
2. Poly 2'-fluoro-2'-deoxyuridylic acid.

References Cited
UNITED STATES PATENTS

| | | |
|---|---|---|
| 3,282,921 | 11/1966 | Verheyden et al. __ 260—211.5 R |
| 3,539,550 | 11/1970 | Greenberg et al. __ 260—211.5 R |
| 3,585,188 | 6/1971 | Marumoto et al __260—211.5 R |
| 3,652,538 | 3/1972 | Niblack _____ 260—211.5 R |

JOHNNIE R. BROWN, Primary Examiner

U.S. Cl. X.R.

195—28 N; 424—180